US006239097B1

(12) United States Patent
Wilson

(10) Patent No.: US 6,239,097 B1
(45) Date of Patent: *May 29, 2001

(54) CLEANING FORMULATION

(75) Inventor: Paul A. Wilson, Canton, GA (US)

(73) Assignee: Product Source International, Inc., Mississauga (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/781,221

(22) Filed: Jan. 10, 1997

(51) Int. Cl.$^7$ .................................. C11D 3/18; C11D 3/43
(52) U.S. Cl. .......................... 510/405; 252/364; 510/108; 510/109; 510/406; 510/407; 510/461; 510/499; 510/504
(58) Field of Search ..................................... 510/405, 108, 510/109, 406, 407, 433, 461, 504; 1/499; 252/364; 585/455, 446

(56) References Cited

U.S. PATENT DOCUMENTS

| | | | | |
|---|---|---|---|---|
| 4,123,395 | * | 10/1978 | Maguiure, Jr. et al. | 510/221 |
| 4,589,994 | * | 5/1986 | Moseman | 424/196.1 |
| 4,683,008 | * | 7/1987 | Betts et al. | 134/27 |
| 4,734,215 | * | 3/1988 | Prigge | 510/407 |
| 4,759,867 | * | 7/1988 | Choy et al. | 510/384 |

FOREIGN PATENT DOCUMENTS 57-64624 * 4/1982 (JP) .

OTHER PUBLICATIONS

WPIDS Abstract No. 94–101169, abstract of WIPO Patent Specification No. 94/05759, Mar. 1994.*

* cited by examiner

*Primary Examiner*—Anthony Green
(74) *Attorney, Agent, or Firm*—Reinhart, Boerner, Van Deuren, Norris & Rieselbach, s.c.

(57) ABSTRACT

A cleaning formulation containing an alkyl aromatic useful as a solvent. The alkyl aromatic generally is a a mono-, di-, or tri-alkylated aromatic. This cleaning composition has excellent balance between solvency, flash point and odor and is useful in a variety of cleaning situations.

13 Claims, No Drawings

CLEANING FORMULATION

BACKGROUND OF THE INVENTION

This invention relates to cleaning formulation containing a chemical substance which has broad application as a solvent. Such solvent has a set of chemical and physical properties such that it has broad application and can replace many other substances that are detrimental to the environment and have relatively high toxicity to humans. The properties of the invention allow for its application in many cleaning formulations as well as application in the neat state.

Solvents make up a very broad and important segment of the chemical industry worldwide. They have application in all levels of activity from manufacturing of other chemical substances to application in formulated products used in such areas as cleaners, polishes, pesticides, dying, paper manufacturing, coatings, inks etc.

The solvents themselves are as diverse as their applications and uses. The general term "solvent" implies an organic chemical substance i.e. composed of carbon and hydrogen. When only carbon and hydrogen are present, the compounds are classified as hydrocarbons—hence the term "hydrocarbon solvent" refers to solvents of this molecular composition. The primary source of this class of solvents is petroleum. Common petroleum hydrocarbon solvents are mineral spirits, kerosene, Stoddard solvent, various thinners, petroleum distillates, naphtha and aromatics. Most of the hydrocarbon solvents derived from petroleum are mixtures and have variable compositions depending upon the source of the petroleum and the manufacturing parameters employed in their production. Because of their variable composition they also have variable properties which may cause problems in their use applications.

If other elements are introduced into the chemical molecules, new classes of solvents result. The most important elements are chlorine and fluorine (called halogens) and oxygen. Other elements that are less frequently present include nitrogen, sulfur and phosphorus.

Halogenated hydrocarbon solvents contain carbon, hydrogen and chlorine, fluorine or both chlorine and fluorine. As a group these Halogenated solvents have many very desirable properties such as high solvency, high evaporation rates and high flash points. However, because of their detrimental effects on the environment and relatively high human toxicity, most of these substances are either banned from general use or are restricted in their use as solvents.

Oxygenated solvents—those containing oxygen, carbon and hydrogen are further divided into chemical classes such as alcohols, ketones, esters and ethers. Each of these classes has specific properties which leads to it being more specialized in their application as solvents. Certain of these compounds exhibit varying degrees of relatively high human toxicity.

The important properties of solvents include:
the ability to dissolve other materials (solvency). purity and/or consistent composition
evaporation characteristics (vapor pressure and non-volatile residue)
adverse effects on humans (toxicity)
adverse effects on the environment (biodegradation, ozone depletion)
fire hazards (flash point)
availability
cost
regulatory concerns e.g. EPA, OSHA and DOT.

There is no one, perfect solvent that possesses all desirable properties and further many of their properties are related to each other. Therefore compromise is necessary.

Primarily because of regulatory concerns a research effort was initiated to design a chemical molecule that would have the best balance of desirable properties and have the broadest application as a solvent. The primary properties used as a basis were low human toxicity, low environmental impact, low fire hazard and high solvency or broad acceptable solvency.

The first consideration was to select a class of chemical substances for examination that could result in a unique, new, never used substance. Many halogenated molecules were not acceptable due to their environmental and toxicity profiles. Others are extremely costly to manufacture. Oxygenated compounds were discounted as they are more restricted in their applications as solvents. Interest then turned to hydrocarbons. Hydrocarbons are further divided into aliphatic (paraffinic) and aromatic (benzene based). Aliphatic hydrocarbons are found in crude petroleum and are therefore the components of "petroleum distillates. Aromatic compounds are based on the presence of the benzene ring in the molecules and are also found in some crude petroleum. They, however, may also be made synthetically. These compounds are referred to as alkyl benzenes in that they have an alkyl group attached to a benzene ring. They are represented by:

 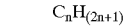  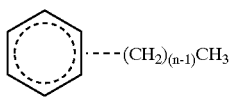

Benzene Ring    Alkyl Group    Alkyl Benzene

The alkyl group may have any number of carbon atoms indicated by the value of "n" with a practical upper limit of about 20 to 24.

The molecules made in the past were not used in solvent applications and the focus was for intermediates used in the production of detergents and pharmaceuticals.

Alkylation of aromatics is a well studied and industrially utilized reaction. For the alkylation reaction to occur Lewis and Bronsted acids, including a variety of fixed bed catalytic Zeolite systems have been used. The processes for alkylation with Friedel-Crafts type catalysts such as aluminum chloride, boron trifluoride, sulfuric acid, hydrochloric acid and phosphoric acid are well known and used commercially. These systems are very often difficult to handle due to separation and corrosion problems as well as dealing with the effluent streams. Several fixed bed systems based on Zeolites and pillared clays are also described in the literature. This invention is not about a new process, as existing processes can be utilized. It is an invention based on a class of molecules designed for specific applications, in which the molecules have never been made before or utilized as solvents.

In U.S. Pat. No. 3,585,253 inventor S.K. Huang describes a method for the dehydrogenation of paraffins to olefins and subsequent alkylation of specifically benzene using anhydrous HF as the catalyst. The ratio of benzene to olefin in this patent is 6:1 and the HF to olefin is 18:1 at a reaction temperature of 50° C. and atmospheric pressure. Several other patents such as U.S. Pat. Nos. 3,494970, 3,830,865 and 3,494,971 describe similar HF systems.

Usually the current commercial applications of HF catalysts are for the production of linear alkyl benzene (LAB)

which is used for the production of detergent linear alkyl benzene sulfonate (LAS). The end use is therefore a detergent.

Other typical systems utilized commercially are the aluminum chloride systems as described in U.S. Pat. Nos. 3,703,559, 3,631,123 and 3,674,885. Because of the problems of corrosion and separation of the products from the catalysts and effluent problems, the focus has shifted towards the cleaner, solid phase systems.

U.S. Pat. No. 3,251,897 describes the alkylation process in Zeolites (crystalline alumina silicates) such as Zeolite X, Zeolite Y, faujasite, heulandite, clinoptilite, mordenite, and dachiardite. Other patents using similar systems include U.S. Pat. Nos. 3,631,120, 3,641,177 and 2,904,607. In particular U.S. Pat. No. 5,043,501 describes the catalytic alkylation and dehydrocyclization using a Zeolite catalyst. In this patent a process is described for the production of 2,6-dimethylnaphtalene by the alkylation of toluene with pentene-1 using a Zeolite with a Constraint Index of not greater than 5, preferably not greater than 3. The method by which Constraint Index is determined is described in U.S. Pat. No. 4,016,218. Specific examples of the catalysts used are ZSM-4, ZSM 12, ZSM-20, ZSM- 50, MCM-22, TEA Mordenite, Clinoptilolite, REY amorphous Silica-alumina, dealuminized Y and Zeolite Beta. The preferred system is based on the MCM-22 catalyst. The catalyst was stabilized by steaming 75 to 100% steam at 315 to 500° C. and pressures of 100 to 2500 Kpa for 1 to 200 hours. Alkylation takes place by flowing the reactants pentene-1 and toluene at a temperature of 50 to 500° F. and pressures of 1 to 25 bar. The toluene to pentene-1 feed ratio expressed as the molar ratio is varied from 0.5:1 to 5:1. The feed weight hourly space velocity (WHSV) of about 0.5 to 100 $hr^{-1}$. The space velocity is determined by using the full catalyst weight. The main product produced via batch or continuous mode is the isoamyl toluene (90%).

In U.S. Pat. No. 5,146,026 the alkylation of aromatic hydrocarbons in particular benzene, with C2 to C20 preferably C8 to C16 mono-olefins is described using an aluminum-magnesium silicate catalyst, to give specifically linear alkyl benzene. The reaction temperature is from 150 to 300° C. at a pressure of 10 to 50 kg/$cm^2$ and the liquid hourly space velocity of 0.5 to 10 $hr^{-1}$. A selectivity of up to 95% for linear alkyl benzene. The molar ratio of benzene to aromatic is preferably from 20:1 to 1:1. The most important characteristic of the catalyst which determines the activity, is the surface acidity. The surface acidity can however not be too high as this may cause several side reactions such as oligomerization, isomerization etc. To achieve a high degree of linearity the major part of the surface area of the catalyst must come from pores with a diameter smaller than 50 Angstrom. This prevents the formation of oligomer. 10 to 25% of the pores must be larger than 50 Angstrom. This is obtained by using materials with high porosity, such as silica, alumina, diatomaceous earth etc. and adding these to the catalyst which is preferably synthetic faujasites (Zeolite X or Y).

BRIEF DESCRIPTION OF INVENTION

An object of the present invention is the provision of multiple cleaning formulations useful: as a general purpose or heavy duty cleaner; in the automotive industry, automotive care and automotive cleaning; in furniture polishes, cleaners and dusting aids; for cleaning metal; for spot removing and pre- spotters; as an adhesive or mastic remover; as a pesticide; as an asphalt extraction compound; as a defoamer; as a spray lubricant; as a parts washer cleaning formulation; for flux removal; in carpet manufacturing; in bearing manufacturers; in paper machine cleaning in the printing industry and oil field machine cleaning.

In accomplishing the foregoing objects, there is provided in accordance with one aspect of this present invention a cleaning formulation comprising neat alkyl aromatics. Alkyl aromatics can be mono-, di-, and tri-alkyl aromatic compounds or combinations thereof.

In other embodiments, various percentages of the alkyl aromatics are used in combination with certain compounds selected from the group containing surfactants, emulsions, alkaline neutralizers, waxes and synthetic waxes, emulsifiers, pesticides, lubricants, propellants, dyes, coloring compounds, perfumes, fragrances and water.

The cleaning formulations are useful in a wide variety of situations.

Other and further objects, features and advantages will be apparent from the following description of the present and preferred embodiments of the invention given for the purpose of disclosure.

DETAILED DESCRIPTION OF INVENTION

It is readily apparent to one skilled in the art that various substitutions and modifications may be made to the invention disclosed herein without departing from the scope and spirit of the invention.

An object of the invention is a cleaning formulation comprising an alkyl aromatic solvent with broad applications and excellent properties that are not available with other commercially produced materials. The alkyl aromatic provides a solvent with a flash point greater than 170° F., Kari Butanol Number greater than 70, Aniline Point less that 40° F., Nonvolatile Residue less than 0.001%, Vapor Pressure less than 0.10 mm Hg at 20° C., and excellent toxicity properties such as LD50 (oral, rats) of >13,000 mg/kg and LD50 (dermal, rats) >20,000 mg/kg with fish (trout) toxicity >2,000 mg/L.

This invention consists of a cleaning formulation comprising a range of molecules manufactured through alkylation of aromatics ("AA"). More specifically the aromatics benzene, toluene and xylene with C4 to CIO mono-olefins preferably C5 to C8 alpha olefins. The mono- ("MAA"), di- ("DAA") and tri- ("TAA")alkyl aromatic compounds and their uses in particular specialty solvent applications. The molecules are designed to have specific solvency, volatility, flash point, biodegradability and low toxicity. As used in this invention, AA can be either a MAA, DAA or TAA or some combination thereof. The cleaning formulation can be the AA in neat form or the combination formulations all as described herein.

Generally AA's were prepared in the laboratory by the alkylation of an aromatic (for example toluene, benzene or xylene) with mono-olefins (for example pentene-1) using aluminum trichloride as catalyst in a batch reaction carried out at ambient atmospheric pressure with the temperature controlled to a maximum of 45–50° C. by use of an ice/water bath. A portion of an aromatic was introduced into the reaction vessel and stirred continuously. The aluminum trichloride was added. The blend of an aromatic and mono-olefin was prepared and transferred to a separatory funnel supported above the reaction vessel. This mixture was added to the stirred reaction vessel containing the cooled aromatic and aluminum chloride at a rate to maintain a temperature of 45° C.+/−5° C. The contents of the reaction vessel was decanted into a beaker to separate the catalyst from the reaction mixture. A dilute, aqueous solution of caustic soda was added to the beaker and the mixture stirred. After settling, this mixture was decanted to separate the aqueous phase from the reaction mixture. This mixture was then transferred to a distillation apparatus and distilled to isolate the AA.

As a specific embodiment, a MAA was made by adding 250 g of aluminum trichloride to 1667 mL in an ice cooled reaction vessel and the stirrer activated. A premix of 1000 mL toluene and 1014 mL of pentene-1 was introduced to the vessel through a separatory funnel at a rate to maintain the temperature at 45° C.+/−5° C. The total reaction mixture ratio of toluene to pentene-1 was approximately 3 moles toluene to 1 mole pentene-1. Following the separation of the catalyst, 500 mL of water containing approximately 20 g of sodium hydroxide was added and the mixture stirred vigorously. After settling, the upper, organic layer was decanted into another beaker and zeolite added to remove remaining moisture. After stirring this mixture and allowing settling to occur, the liquid containing the MAA and excess toluene was decanted into a distillation flask. Distillation was performed using a variac controlled heating mantel and a packed reflux column attached to a water cooled condenser. Distillate was collected in a series of beakers. The toluene vapors began to condense in the upper region of the condenser when the pot temperature was about 150° C. and the temperature at the condenser entrance was about 105° C. indicating that toluene was being removed. Approximately 1000 mL of toluene was collected. The temperature of the pot was allowed to increase to 220° C. Approximately 750 mL was collected over a temperature range of 215° to 223° C. which was the MAA.

The di-alkylated aromatic was prepared using the same general procedure with the molar ratio of an aromatic to mono-olefin reduced to approximately 1:2 and the distillation parameters altered to accommodate the increased boiling point of the DAA.

The tri-alkylated aromatic is prepared by the continued addition of the alkene to the reaction mixture used in the preparation of DAA until the molar quantity of the alkene reaches a three to one ratio to the aromatic.

Poly-alkylated aromatics, i.e. di- and tri-alkylated materials may result from the poly-alkylation of benzene or the alkylation of toluene or xylene. Therefore, di-alkylated benzene may result from the mono-alkylation of toluene. Similarly, tri-alkylated benzene may result from either the di-alkylation of toluene or the mono-alkylation of xylene. Each type of product may be prepared employing the procedures outlined herein.

As used herein, the term "cleaning formulation" represents a formulation of the AA used for a variety of cleaning purposes. Cleaning purposes can include a general purpose cleaner, a heavy duty cleaner, an engine cleaner, an engine degreaser, a brake cleaner, a tar remover, a bug remover, a carburetor and choke cleaner, hand cleaners, furniture polish, furniture cleaners and furniture dusting aids, metal cleaners, spot removers, pre-spotters, adhesive removers, mastic remover, pesticides, asphalt extraction compounds, defoamers, spray lubricants and parts washer. Thus one skilled in the art will clearly recognize that the cleaning formulations of the present invention can be used for a wide variety of activities.

As used herein, the term "surfactant" refers to a variety of surface active agents which are soluble compounds that reduce the surface tension of liquids or reduce the interfacial tension between two liquids or liquid and a solid. The skilled artisan recognizes that many such surfactants are known and that their properties, chemical description and sources are found in a variety of recognized references including *McCutcheon's Volume* 1, *Emulsifiers and Detergents*, North American Edition 1994. McCutcheon's Division, The Manufacturing Confectioner Publishing, Glen Rock Co., NJ.

Examples of surfactants which are commercially available include ethoxylated nonylphenol (4 Mole EO) (surfonic N-40), ethoxylated nonylphenol (9-10 Mole EO) (surfonic N-95), lauryl dimethyl amino oxide (Ammonyx LO), sodium lauroyl sarcosinate (Hamposyl L-30 or Vanseal NALS-30), DeSophos" (free acid form of complex organic phosphate ester), dodecylbenzenesulfonic acid (DDBSA), polysorbates including polysorbate 80, and polyethoxylated alcohols.

Other compounds useful in the present invention include alkaline neutralizers such as monoethanolamine (2-hydroxyethylamine) (MEA) and triethanolamine (tri (2 hydroxyethyl) amine) (TEA).

Waxes and synthetic waxes are useful in the present invention. Some examples include: SaSolv 250, synthetic beeswax, SASOL M wax, wax acid triglyceride and lanolin.

It has also been discovered that long chain organic carboxylic acids are useful in certain embodiments. Examples include oleic acid (cis-9-octadecenoic acid) and stearic acid.

Certain emulsifiers have also been found to be useful in the present invention. These include nonionic emulsifiers, sorbitan oleate, propyleneglycol-t-butylether (PTB), Armal 22 emulsifier and Armal 33 emulsifier.

In certain other embodiments, specific chemicals can be used; for example, pesticides, propellants, lubricants, dyes and coloring compounds, perfumes and fragrances.

The following examples are offered by way of illustration and are not intended to limit the invention in any matter. The percent is percent by weight of the compound.

EXAMPLE 1

Preparation of Mono- and Di-Alkylated Toluenes (MAT)

Anhydrous HF was used as a catalyst for the conversion of pentene-1 and toluene to mono- and di-substituted toluenes. The molar ratio of toluene to pentene-I was approximately 6:1 and the HF to pentene-1 ratio was 18:1. The reaction was performed in a commercial scale reactor at a temperature of 50° C. and 3 Bar pressure. The product was separated from the reaction medium via subsequent distillation. Fluorocarbons were removed using an alumina column. Unreacted HF was removed from the product, with trace quantities being removed by 5% caustic wash. After separation, a 99% mono alkylated toluene (MAT) was obtained. Gas chromatographic analysis revealed five isomers. Toxicology studies revealed a very low degree of toxicity with LD5 (oral,rat) of >13,600 mg/kg and $LD_{50}$ (dermal, rat) of >24,600 mg/kg. An additional study with rainbow trout showed acute toxicity for 96 hour exposure >2620 mg/L.

In specific embodiments of the cleaning formulations shown in the examples below, MAT was used as the alkylated aromatic.

EXAMPLE 2

General Cleaning Formulation

The alkylated aromatics of the present invention can be used in a variety of formulations. General formulations for cleaning purposes are shown below:

| 1. COMPONENT | % BY WEIGHT |
| --- | --- |
| AA | 40–90 |
| WATER | 3–16 |
| AMMONXY LO | 0–57 |
| DYE | As Desired |
| PERFUME | As Desired |

The AA and surfactant are mixed, the water, dye and perfume are added and mixed until the solution is homogeneous.

| 2. COMPONENT | % BY WEIGHT |
| --- | --- |
| AA | 25.0 |
| SURFACTANT | 12.5 |
| DDBSA | 3.5 |
| DESOPHOS ™ | 6.25 |
| AMMONXY LO | 3.5 |
| PTB | 0–3 |
| LANOLIN | 0–1 |
| NAOH (50%) | 3 |
| WATER | 40–50 |

EXAMPLE 3

General Purpose Cleaner Formulation

General Purpose Cleaners are employed as hard surface cleaners (i.e. floors and walls) for removing light to moderate levels of soils. This example can be compared with traditional cleaners that employ terpenes such as pine oil, d-limonene or dipentene; petroleum distillates or oxygenated solvents. The advantages of the present invention in such formulations include: a very low odor allowing for the use of any desired fragrance; good cleaning ability without damage to the substance being cleaned; uniformity and consistency of properties and prices compared to naturally derived terpenes. The specific formulation of the General Purpose Cleaner is show below:

| COMPONENT | % BY WEIGHT |
| --- | --- |
| AA | 50.00 |
| SURFONIC N-40 | 5.00 |
| SURFONIC N-95 | 5.00 |
| H$_2$O | 40.00 |
| DYE | As Desired |
| PERFUME | As Desired |

The AA and surfactants are mixed, then water, dye and perfume are added and mixed until solution is homogenous.

EXAMPLE 4

Heavy Duty Cleaner

Heavy Duty Cleaners are water based cleaners employed in the removal of heavy soils such as grease and oils primarily in industrial settings. The biodegradability and low vapor pressure of the Heavy Duty Cleaner makes this cleaner more environmentally friendly than those employing petroleum based solvents and has lower toxicity than some common oxygenated solvents. A specific formulation of the Heavy Duty Cleaner is:

| COMPONENT | % BY WEIGHT |
| --- | --- |
| AA | 50.00 |
| MEA | 3.50 |
| H$_2$O | 46.00 |
| DYE | As Desired |
| PERFUME | As Desired |

The AA and surfactant are mixed, then water, dye and perfume are added and mixed until solution is homogeneous.

EXAMPLE 5

Automotive Cleaners Formulation

Automotive products employ solvents in many applications such as Engine Degreasers, Brake Cleaners and Tar Removers. The cleaners of the present invention are very effective in performance and are safer to use due to higher flash point, lower volatility and decreased toxicity compared to xylenes, toluol, methanol and many petroleum distillates.

I. Engine Degreaser

This example illustrates the use of the invention in the removal of grease from automobile engines. In the preferred method the cleaning of such engines is accomplished by applying the preparation to the dirty engine from an aerosol or spray container, agitation of heavily soiled areas with a brush, allowing 3 to 5 minutes dwell time and rinsing with a stream of water from a garden hose with a nozzle attached. Grease, oil and dirt are effectively removed leaving a clean engine.

| Formula 1. COMPONENT | % BY WEIGHT |
| --- | --- |
| AA | 85.00 |
| SURFONIC N-40 | 5.00 |
| SURFONIC N-95 | 5.00 |
| AMMONXY LO | 5.00 |

The AA and surfactants are mixed, then water is added and the formulation is mixed until homogeneous.

| Formula 2. COMPONENT | % BY WEIGHT |
| --- | --- |
| AA | 25.00 |
| SURFONIC N-95 | 12.50 |
| DDBSA | 3.50 |
| DESOPHOS ™ | 6.25 |
| AMMONXY LO | 3.50 |
| PTB | 2.00 |
| NAOH 50% | 3.00 |
| H$_2$O | 44.25 |

The AA and surfactants are mixed, then water is added and the formulation is mixed until homogeneous. The pH is then adjusted to 8.0.

II. Brake Cleaner

This formulation is very effective as a replacement for solvents such as xylene and toluene in aerosol brake cleaners the resulting product does not contain Hazardous Air Pollutants and has reduced Volatile Organic Compound. In the process of replacing brake shoes/pads or in repairing brake systems, it is desirable to clean the system prior to performing the repairs. The formulation for Brake Cleaner is:

| COMPONENT | RANGE % BY WEIGHT | % BY WEIGHT |
|---|---|---|
| AA | 90–96 | 96.00 |
| $CO_2$ PROPELLANT | 4–10 | 4.00 |

III. Tar and Bug Remover

| COMPONENT | % BY WEIGHT |
|---|---|
| AA | 85.00 |
| SURFONIC N-40 | 5.00 |
| SURFONIC N-95 | 5.00 |
| AMMONXY LO | 5.00 |

IV. Carburetor & Choke Cleaner

For this application, the invention was prepared as an aerosol product in a proper container with an appropriate propellant.

| COMPONENT | % BY WEIGHT |
|---|---|
| AA | 6.00 |
| PTB | 10.00 |
| $CO_2$ PROPELLANT | 4.00 |

EXAMPLE 6

Hand Cleaners

Hand cleaners used by mechanics and industrial workers must be able to remove stubborn, ground in, greasy soil from hands without causing harmful effects. Examples are given below employing the invention.

I. High Viscosity, Waterless Hand Cleaner

| COMPONENT | % BY WEIGHT |
|---|---|
| AA | 20.00 |
| SURFONIC N-95 | 2.50 |
| OLEIC ACID | 8.00 |
| LANOLIN | 0.50 |
| TEA | 3.50 |
| $H_2O$ | 65.50 |
| PERFUME | As desired |
| DYE | As desired |

The AA, Surfonic and Oleic Acid are mixed until dissolved. Mix water and other ingredients in separate vessel. Add solvent portion to water with stirring and mix until homogeneous at a temperature of 120° F. .

II. Industrial Hand Cleaner-Micro-Emulsion Handcleaner

| COMPONENT | % BY WEIGHT |
|---|---|
| AA | 25.00 |
| SURFONIC N-95 | 12.50 |
| DDBSA | 3.50 |
| DESOPHOS ™ | 6.25 |
| AMMONXY LO | 3.50 |
| LANOLIN | 0.50 |
| $H_2O$ | 45.75 |
| PERFUME | As desired |
| DYE | As desired |

The AA and surfactants are mixed, then water, perfume and dyes are added. The pH is adjusted to 8.0 and the mixture is mixed vigorously.

EXAMPLE 7

Furniture

Furniture polishes, cleaners and dusting aids contain various solvents as carriers, cleaning agents or to cause dust to adhere to a cleaning cloth or possibly some combination. The formulation of the invention can serve as a solvent and perform each of the listed functions. It can also perform equally well in preparations used on wall paneling.

I. Furniture Polish

| COMPONENT | % BY WEIGHT |
|---|---|
| AA | 5.00 |
| SASOLV250 | 15.00 |
| SYNTHETIC BEESWAX | 2.00 |
| WAX ACID TRIGLYCERIDE | 3.25 |
| AMMONXY LO | 3.00 |
| $H_2O$ | 71.70 |
| SORBITAN OLEATE | 2.50 |
| POLYSORBATE 80 | 0.80 |

Mix the AA, SASOLV 250, BEESWAX and WAX ACID and heat to 60° C. until homogenous (solvent blend). In separate vessel mix water, Sorbitan Oleate and Polysorbate 80. Add to solvent blend and mix vigorously. Mix until mixture cools to 38° C.

II. Furniture Cleaner

| COMPONENT | % BY WEIGHT |
|---|---|
| AA | 95.00 |
| SASOLV250 | 1.00 |
| $CO_2$ PROPELLANT | 4.00 |

III. Dusting Aid

| COMPONENT | % BY WEIGHT |
|---|---|
| AA | 91.00 |
| SASOLV250 | 5.00 |
| $CO_2$ PROPELLANT | 4.00 |

EXAMPLE 8

Metal Cleaner

Metal cleaning can entail the removal of oils and other soils from metals in preparation for applying paint or other coatings. An example of Metal Cleaner is the formulation for a stainless steel cleaner.

| COMPONENT | % BY WEIGHT |
|---|---|
| AA | 15.00 |
| SASOLV250 | 75.00 |
| PTB | 10.00 |
| HAMPOSYL L-30 | 0.05 |

EXAMPLE 9

Spot Removers and Prespotters

I. Laundry Pre-Spotters; Premium Quality Micro-Emulsion Prespotter Industrial Oils Laundry pre-spotters or spot removers contain solvents to aid in the removal of greasy or oily soils. The invention, with its high solvency, is ideal in such applications.

| COMPONENT | % BY WEIGHT |
|---|---|
| AA | 25.00 |
| SURFONIC N-95 | 12.50 |
| DDBSA | 3.50 |
| DESOPHOS ™ | 3.50 |
| AMMONXY LO | 3.50 |
| NAOH 50% | 3.00 |
| $H_2O$ | 44.25 |

The AA and surfactants are mixed. Water is added to the combination and mixed vigorously. The mixture is adjusted to pH 8.0.

II. Solvent Based Prespotter

| COMPONENT | % BY WEIGHT |
|---|---|
| AA | 70.00 |
| SURFONIC N-40 | 10.00 |
| SURFONIC N-95 | 10.50 |
| AMMONXY LO | 5.00 |
| PTB | 3.00 |
| $H_2O$ | 2.00 |

The AA and surfactants are mixed, then water is added.

III. Textile Spot Remover

| COMPONENT | % BY WEIGHT |
|---|---|
| AA | 95.00 |
| PTB | 5.00 |

This formulation has a flash point 170° F. TCC.

EXAMPLE 10

Adhesive Removers

This example illustrates the use of the invention in the application of adhesive removers replacing solvents such as xylene, toluene and aromatics. Formulations containing the MAT show excellent removal of adhesives from various substrates in a short period of time and without disagreeable odors. In this use the MAT can be used without addition of other materials. Adhesive residues remaining after the removal of labels, decals or similar types of self-adhesive materials was readily removed by application of the invention by direct application, by aerosol application, application with a cloth saturated with the invention or by any suitable means. After application, the softened residue was removed by wiping with a cloth. Substrates from which the adhesive was removed included metals, glass, painted surfaces and certain plastics.

I. Adhesive/Mastic Remover Formula

| COMPONENT | % BY WEIGHT |
|---|---|
| AA | 85.00 |
| SURFONIC N-95 | 2.50 |
| SURFONIC N-40 | 2.50 |
| PTB | 10.00 |

II. Adhesive/Mastic Remover Formula

| COMPONENT | % BY WEIGHT |
|---|---|
| AA | 85.00 |
| SURFONIC N-95 | 2.50 |
| SURFONIC N-40 | 2.50 |

EXAMPLE 11

Pesticides

| COMPONENT | % BY WEIGHT |
|---|---|
| AA | 49.20 |
| CHLORPYRIFOS | 45.82 |
| EMULSIFIER 1 | 2.49 |
| EMULSIFIER 2 | 2.49 |

EXAMPLE 12

Miscellaneous

I. Asphalt Extraction Compound

| COMPONENT | % BY WEIGHT |
|---|---|
| AA | 88.00 |
| SURFONIC N-95 | 6.00 |
| SURFONIC N-40 | 6.00 |

This formulation meets ASTM D-2172 Standard Test Method.

II. Defoamer

| COMPONENT | % BY WEIGHT |
|---|---|
| AA | 85.00 |
| STEARIC ACID | 15.00 |

III. Spray Lubricant

| COMPONENT | % BY WEIGHT |
|---|---|
| AA | 93.00 |
| MOLYBDENUM DISULFIDE | 1.00 |
| MOLYBDENUM RESIN | 1.00 |
| $CO_2$ PROPELLANT | 4.00 |

IV. Parts Washer

| COMPONENT | % BY WEIGHT |
|---|---|
| AA | 89.00 |
| SASOLV 250 | 1.00 |
| PTB | 10.00 |

EXAMPLE 13

Flux Removal

The AA is used in the electronics industries involved with circuit board manufacturing in the removal of flux left on the boards following soldering operations. The boards are cleaned by means of a spray or dipping operation. The AA is used neat in these applications. Following the spraying or dipping operation, the boards are subjected to warm, forced air. The vapors are recovered by use of an Organic Vapor Recovery System. Because of the low vapor pressure of the AA, the vapors are easily condensed and the AA can be recycled.

EXAMPLE 14

Cleaner in Carpet Manufacturing

The tufted carpet industry uses various types of latex in the manufacture of carpeting. The AA is ideally suited for cleaning the latex application machinery and surrounding areas of dried latex. Because of the slow evaporation rate of the AA, it can be applied to the dried latex and allowed to penetrate over an extended period of time. After the AA has penetrated and softened the dried latex it may be easily scrapped up for disposal. The AA also has application in the removal of latex which often comes in contact with the face of the carpet. The AA is applied by use of a fabric wet with the AA and used to remove the spots of latex by agitation.

EXAMPLE 15

Bearing Manufacturing

One of the latter operations in bearing manufacturing is the removal of processing lubricants from the bearings. This may be in the form of oily or greasy soils including metal fragments. The AA may be employed in either a dip or a spray operation. The high solvency, low vapor pressure and low toxicity of the AA make it very desirable for this application.

EXAMPLE 16

Asphalt Extraction

Asphaltic concrete used in the paving or surfacing of highways must be checked for quality assurance and quality control on a routine basis. One of the quality control procedures involves the removal of the asphalt (tar) from the aggregate (stone) to insure that the proper proportions are maintained. This is accomplished by extracting or dissolving the asphalt in a laboratory procedure using a suitable solvent. During this operation the solvent is heated to approximately 100° F. which can pose safety concerns for low flash point solvents. The low flash point and low vapor pressure along with the high solvency contribute to the desirability of AA for this application. The AA may be used neat or may be blended with emulsifiers. A suitable formulation is a mixture containing 90 to 94% AA, 3 to 5% Surfonic® N-40 and 3 to 5% Surfonic® N-95.

EXAMPLE 17

Paper Machines

Various machinery components in paper manufacturing such as washer fabrics, forming fabrics and calendar rolls accumulate various soils during operation that must be cleaned routinely. The type of soils generally lend themselves to be cleaned most effectively by use of a solvent. The AA is well suited for these cleaning operations due to the low vapor pressure, high flash point, and good solvency characteristics.

EXAMPLE 18

Oil Field Machinery Cleaning

Oil field equipment and machinery is cleaned with solvents to remove the bituminous soils that accumulate. The AA has high solvency for this type soil and readily removes it. Environmental concerns must be addressed in these operations and the AA, with its low vapor pressure and low water solubility is very desirable in helping to protect the environment from air and water contamination.

EXAMPLE 19

Printing Industry

Offset printing presses must be kept free of ink residue and lint to produce high quality products. The presses also must be cleaned during change over from one job to another. The AA with its good solvency characteristics, low flash point and low toxicity is well suited for these applications. The AA is applied either manually with printer towels or automatically by the presses.

All patents and publications mentioned in the specification are indicative of the levels of those skilled in the art to which the invention pertains. All patents and publication are herein incorporated by reference to the same extent as if each individual publication was specifically and individually indicated to be incorporated by reference.

The present invention can be a cleaning formulation comprised of about 40–90% by weight of an alkylated aromatic (AA), about 3–22% by weight surfactant, and about 0–57% by weight water. Alternatively, (a) the AA is about 50%, the surfactant is about 10%, and water is about 40%; (b) the AA is about 50%, the surfactant is about 3.5% monoethanolamine, and water is about 46.5%; or (c) the AA is about 85%, and the surfactant is about 15%.

This invention can also be a cleaning formulation comprising about 90 to 96% by weight AA and about 4–10% by weight propellant or, more specifically, about 95% AA and about 4% carbon dioxide. Alternatively, the formulation can be about 86% AA, about 10% PTB, and about 4% $CO_2$.

The present invention can also be a cleaning formulation comprised of about 25% by weight AA, about 16% by weightof a surfactant, about 3.5% by weight DDBSA, about 0–1% by weight lanolin, about 0–3% by weight propyleneglycol-t-butylether (PTB), about 3% by weight of a 50% solution NaOH and about 40–50% by weight water. In other related embodiments, the PTB component is about 2% and the formulation is diluted with about 44.5% water; alternatively, the lanolin component is about 0.5%, and water is present at about 45.75%.

This invention can also be (a) a cleaning formulation comprised of about 15–25% by weight AA, about 2–4% by weight a surfactant, about 6–0% by weight oleic acid, about 0–1% by weight lanolin, about 2.5 to 5% by weight triethanolamine and about 63–76% by weight water; (b) a cleaning formulation comprised of about 3–8% by weight AA, about 13–22% by weight a synthetic wax component, about 1–4% by weight wax acid triglyceride,about 65–75% by weight water, and about 2–4% by weight sorbitan oleate; (c) a cleaning formulation comprising about 12–18% by weight AA, about 70–85% by weight a wax component, and about 5–15% by weight emulsifier; (d) a cleaning formulation comprised of about 65–75% by weight AA, about 17–31% by weight a surfactant about 1–5% by weight PTB and about 0–2% by weight water or about 90–100% by weight AA and abut 0–10% by weight PTB; (e) a cleaning formulation comprised of about 80–90% by weight AA, about 4–8% by weight a surfactant and about 6–12% by weight PTB; (f) a cleaning formulation comprised of about 80–95% by weight AA, about 2–20% by weight a surfactant or about the same weight percentage of Aa and about 5–20% by weight stearic acid; (g) a cleaning formulation comprised of about 85 to 93% by weight AA, and about 8–13% by weight PTB; (h) a cleaning formulation comprised of about 87–95% by weight AA, about 0.5–3% by weight molybdenum disulfide, about 0.5–3% by weight molybdenum resin and about 3–7% by weight carbon dioxide; or (i) a cleaning formulation consisting of AA.

The present invention also includes a cleaning formulation wherein the AA is selected from the group consisting of a mono-alkylated aromatic (MAA), a di-alkylated aromatic (DAA), a tri-alkylated aromatic (TAA) and combinations thereof. In particular, the aromatic component can be toluene, xylene or benzene. The AA component of any of the aforementioned cleaning formulations can be selected from the group consisting of mono-alkylated toluene, mono-alkylated benzene, and mono-alkylated xylene.

One skilled in the art will readily appreciate that the present invention is well adopted to carry out the objects and attain the ends and advantages mentioned as well as those inherent therein. Compositions, compounds, formulations, methods and procedures and techniques described herein are presently represented of the preferred embodiments are intended to be examples and are not intended as limitations on the scope. Changes therein and other uses will occur to those skilled in the art which are encompassed within the spirit of the invention and defined by the scope of the appended claims.

What I claim is:

1. An aqueous cleaning composition comprising aria alkylated aromatic compound, said compound selected from the group consisting of $C_4$–$C_{10}$ mono-, di-, and trialkylated benzene, toluene and xylene and combinations thereof, water, and an emulsifier.

2. The composition of claim 1 wherein said aromatic compound is selected from the group consisting of mono-, di- and trialkylated benzene and combinations thereof.

3. The composition of claim 1 wherein said compound is selected from the group consisting of mono- and dialkylated toluenes and combinations thereof.

4. The composition of claim 1 wherein said emulsifier is selected from the group consisting of cationic surfactants, nonionic surfactants, anionic surfactants, quaternary ammonium salts, ethoxylated amines and combinations thereof.

5. The composition of claim 1 wherein said aromatic compound is greater than about 2% by weight of said composition.

6. The composition of claim 1 further including a propellant.

7. A cleaning composition comprising an organic aromatic hydrocarbon solvent component, said solvent component selected from the group consisting of $C_4$–$C_7$ mono-, di-, and trialkylated benzene, toluene and xylene compounds and combinations thereof.

8. The composition of claim 7 further including water and an emulsifier selected from the group consisting of cationic surfactants, nonionic surfactants, anionic surfactants, quaternary ammonium salts, ethoxylated amines and combinations thereof.

9. A method of using a synthesized alkylated aromatic compound to provide specific solvent properties to a cleaning composition, said method comprising:
   synthesizing an alkylated aromatic compound with specific solvent properties, by $C_4$–$C_{10}$ alkylation of an aromatic compound selected from the group consisting of benzene, toluene and xylene; and incorporating said synthesized aromatic compound into a cleaning composition to provide said composition specific solvent properties selected from the group consisting of volatility, flash point, biodegradability, solvency and toxicity properties.

10. The method of claim 9 wherein said alkylated compound is selected from the group consisting $C_4$–$C_8$ mono-, di- and trialkylated benzene, toluene, and xylene, and combinations thereof.

11. The method of claim 10 wherein said compound is selected from the group consisting of mono- and dialkylated toluenes and combinations thereof.

12. The method of claim 9 wherein said synthetic alkylated aromatic compound is about 2% by weight to about 100% by weight of said composition.

13. The method of claim 12 wherein said composition is diluted with water.

* * * * *

UNITED STATES PATENT AND TRADEMARK OFFICE
CERTIFICATE OF CORRECTION

PATENT NO. : 6,239,097 B1
DATED : May 29, 2001
INVENTOR(S) : Paul A. Wilson

Page 1 of 1

It is certified that error appears in the above-identified patent and that said Letters Patent is hereby corrected as shown below:

<u>Column 16,</u>
Line 2, "aria" should be -- an --

Signed and Sealed this

Fifteenth Day of January, 2002

Attest:

*Attesting Officer*

JAMES E. ROGAN
*Director of the United States Patent and Trademark Office*